United States Patent
Ondrasik

(10) Patent No.: US 6,193,246 B1
(45) Date of Patent: Feb. 27, 2001

(54) SHOPPING CART WITH FRONT GATE

(76) Inventor: V. John Ondrasik, 6150 Sheila St., Los Angeles, CA (US) 90040-2407

( * ) Notice: Subject to any disclaimer, the term of this patent is extended or adjusted under 35 U.S.C. 154(b) by 0 days.

(21) Appl. No.: 09/565,265

(22) Filed: May 5, 2000

(51) Int. Cl.$^7$ .................................................. B62B 3/02
(52) U.S. Cl. ................................ 280/33.995; 280/47.35
(58) Field of Search .................... 280/33.991, 33.992, 280/33.995, 33.996, 47.34, 47.35

(56) References Cited

U.S. PATENT DOCUMENTS

| | | | |
|---|---|---|---|
| 3,115,975 | * 12/1963 | Thompson | 280/33.995 |
| 3,297,108 | * 1/1967 | Davis | 280/33.991 |
| 3,443,665 | * 5/1969 | Zschaech | 280/33.995 |
| 3,751,059 | * 8/1973 | Bunder et al. | 280/33.995 |
| 3,815,932 | * 6/1974 | Ruger | 280/33.995 |
| 4,118,044 | * 10/1978 | Celms | 280/33.995 |
| 4,353,564 | * 10/1982 | Joseloff | 280/33.995 |
| 4,560,180 | * 12/1985 | Ulmer | 280/33.995 |
| 5,385,358 | * 1/1995 | Adamson | 280/33.995 |

FOREIGN PATENT DOCUMENTS

317586 * 11/1969 (CH) ................ 280/33.995

* cited by examiner

*Primary Examiner*—Richard M. Camby
(74) *Attorney, Agent, or Firm*—Brown, Martin, Haller & McClain, LLP

(57) ABSTRACT

A shopping cart has a basket with an opening in its front end, and a gate is movably mounted in the opening for movement between a closed position closing the opening and an open position inside the basket lying on top of the lower wall. The checker can first remove and scan items from the front end of the basket, opening the gate inwardly when sufficient space has been cleared, and can then pull the cart forward under the scanner, and remove and scan items from the remainder of the basket.

7 Claims, 2 Drawing Sheets

SHOPPING CART WITH FRONT GATE

BACKGROUND OF THE INVENTION

The present invention relates generally to shopping carts, and is particularly concerned with a shopping cart with a front gate to permit a checker to unload and scan the contents of the cart.

Conventional shopping carts with no front gate must be unloaded by the shopper onto a conveyor at the check out counter, where they are conveyed to the checker who scans the items to be purchased. However, some shopping carts have a front gate which can be opened outwardly and dropped down onto the check out counter in front of the cart, permitting the checker to unload and scan each item from the cart. It can be difficult for the checker to reach into the back of the basket of such carts to retrieve items, and the gate is very vulnerable to damage.

SUMMARY OF THE INVENTION

It is an object of the present invention to provide an improved shopping cart with a front gate.

According to the present invention, a shopping cart is provided which comprises a wheeled base, a frame projecting upwardly from the base, and a basket having a rear end secured to the frame and projecting forwardly from the frame, the basket having a lower wall, a front end, and spaced side walls, the front end of the basket having an opening, and a gate movably mounted in the opening for movement between a closed position closing the opening and an open position inside the basket lying on top of the lower wall.

In an exemplary embodiment, the gate is movable from the closed position in one direction only into the basket, and cannot be moved outwardly from the basket. With this shopping cart, the checker can first remove and scan items from the front end of the basket, opening the gate inwardly when sufficient space has been cleared, and can then remove and scan items from the remainder of the basket. When used in conjunction with a cantilevered scanner, this shopping cart allows checkers to more readily empty the basket, since front end of the cart can be moved beneath the scanner when the gate is opened, allowing the checker to reach the items in the rear end of the basket.

This arrangement ensures that the checker does not have to reach all the way into the back of the basket from the front end of the basket, since the front end can be pulled forwardly, placing the rear end of the basket closer to the checker. Additionally, the fact that the gate is only opened into the basket, and not outwardly from the basket, makes the gate much less vulnerable to damage. Gates that open outwardly may hang down and be damaged when carts are nested.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

DETAILED DESCRIPTION OF THE DRAWINGS

Figure 1:
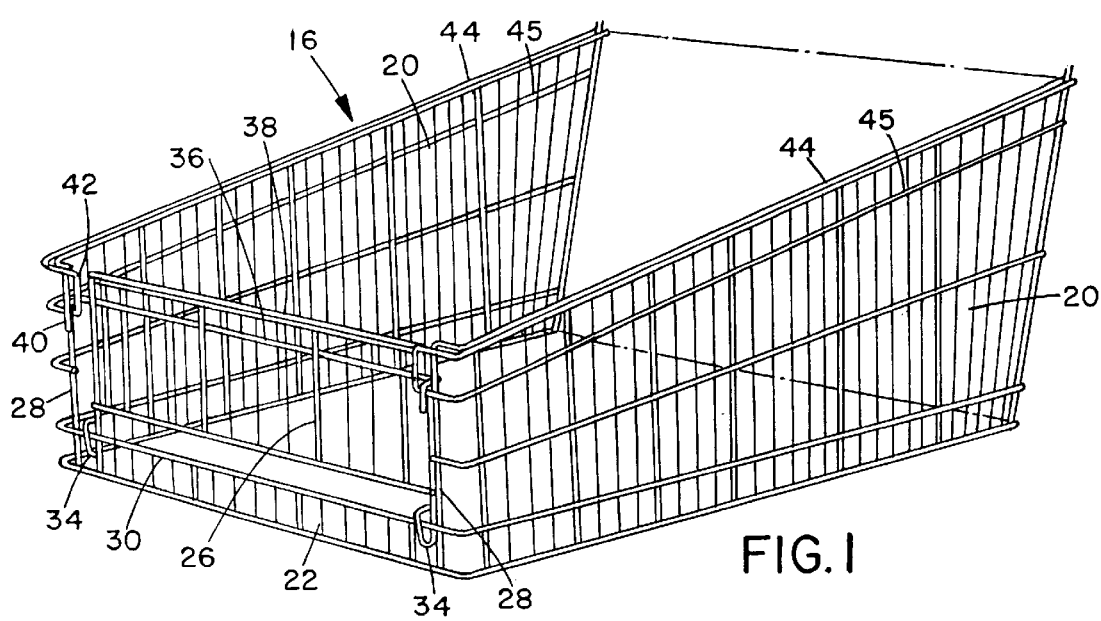
FIG. 1 is a perspective view of a portion of a cart frame with a front gate according to an exemplary embodiment of the invention, showing the front gate in a closed position.
Figure 2:
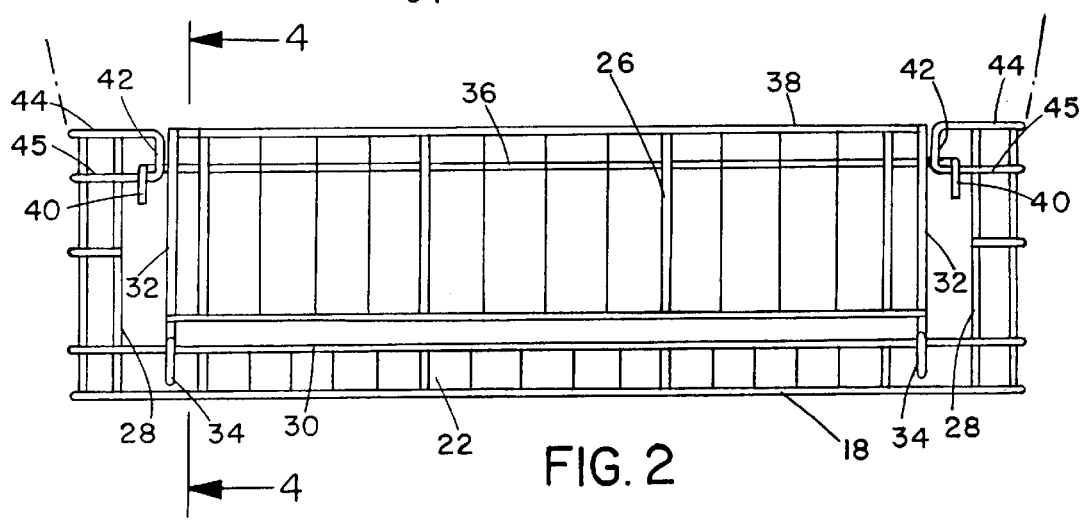
FIG. 2 is an enlarged front end view of the structure.
Figure 3:
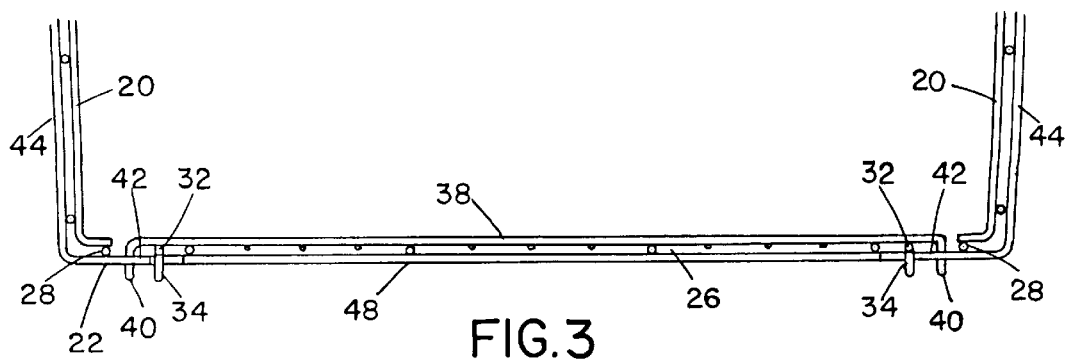
FIG. 3 is a top view of the front end of structure.
Figure 4:
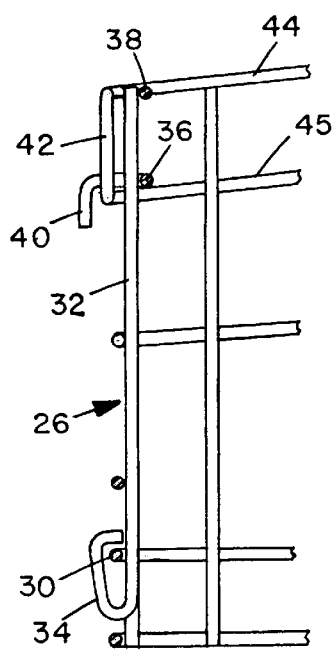
FIG. 4 is an enlarged section view taken on line 4—4 of FIG. 2.
Figure 5:
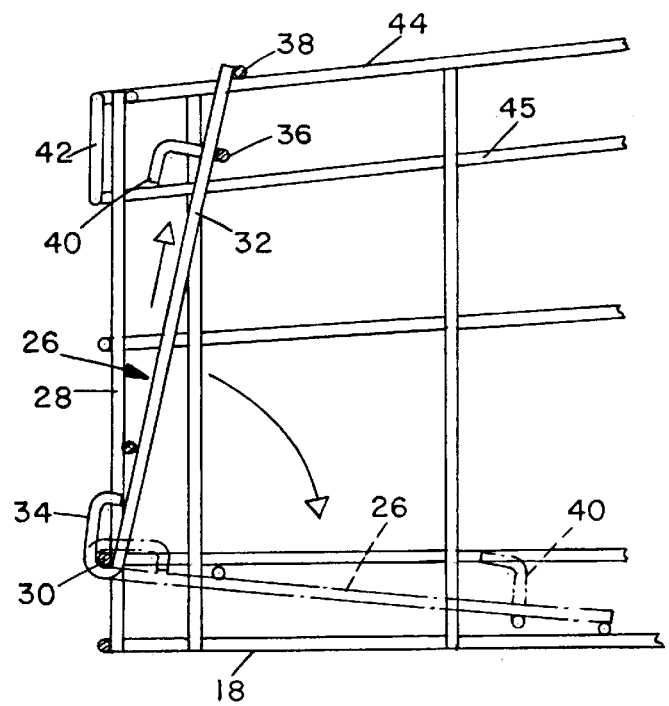
FIG. 5 is a similar sectional view showing the gate partially and fully opened.
Figure 6:
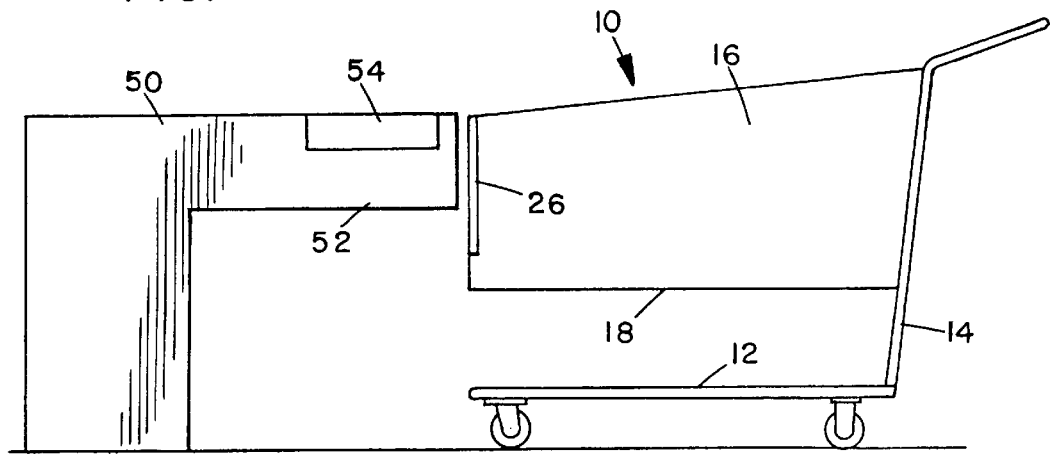
FIG. 6 illustrates diagrammatically the cart initially stationed at a cantilevered check out scanner.
Figure 7:
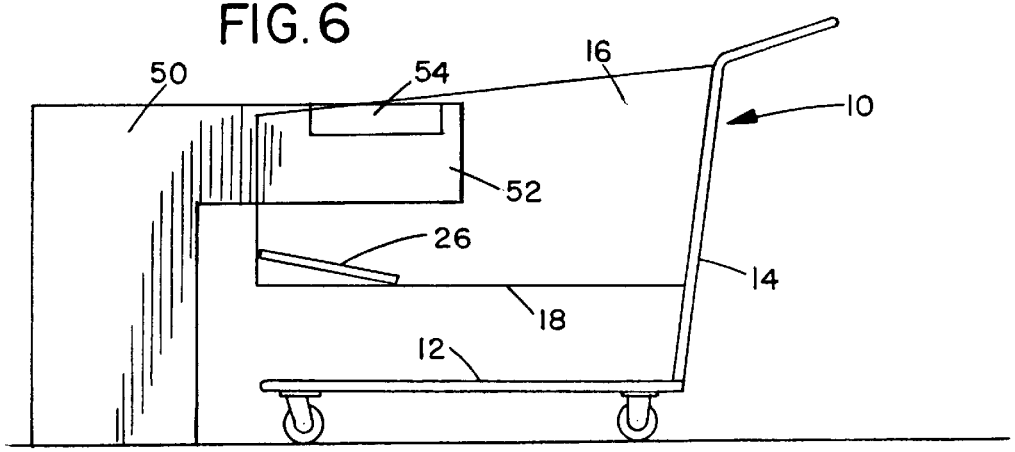
FIG. 7 is a similar view with the front gate opened and the cart pushed under the check out.

FIGS. 1 to 5 illustrate a basket 16 for a shopping cart 10 according to an exemplary embodiment of the present invention, while FIGS. 6 and 7 illustrate a method of unloading and scanning items from the cart 10.

The cart 10 basically comprises a wheeled base 12, a frame 14 extending upwardly from a rear end of the base, and a basket 16 having a rear end secured to the frame and projecting forwardly from the frame above the base, as indicated in FIGS. 6 and 7. The basket 16 is illustrated in detail in FIGS. 1 to 5 and has a lower wall 18, spaced side walls 20, and a front end wall 22. The front end wall 22 has an opening in which a movable gate 26 is secured. The gate 26 is movable from the closed position illustrated in FIGS. 1 and 4 inwardly into the basket into the open position illustrated in dotted outline in FIG. 5, and schematically in FIG. 7.

The basket is of wire grille or mesh construction in the illustrated embodiment, although the basket and or gate may be plastic in alternative embodiments. The front end wall has a pair of vertical wires or rods 28 defining the opposite sides of the opening, and a horizontal hinge rod 30 defining the lower edge of the opening. The gate is also of wire grille construction, and has a pair of rods 32 forming the opposite sides of the gate. Each rod 32 is bent at its lower end to form an elongate eyelet or hinge opening 34 which engages over the horizontal hinge rod 30 forming the lower edge of the opening. The gate can pivot or rotate about rod 30 between the open and closed positions.

A cross bar or rod 36 extends across the gate adjacent the upper end rod 38 of the gate, and the opposite ends of the rod 36 project outwardly from each side of the gate and are shaped to form hooks 40. Each side of the opening has an inward projection or stop 42 adjacent the upper end of the opening, over which the hooks 40 engage when the gate is in the closed position in order to releasably lock the gate in its closed position.

In order to release and open the gate, it is first pulled upwardly to release the hooks 40 from projections 42, as permitted by the elongate shape of eyelets or hinge openings 34, as best indicated in FIG. 5. The gate can then be rotated inwardly until it rests against the lower wall of the basket, as indicated in dotted outline in FIG. 5. The projections 42 have a secondary function in acting as stops to prevent the gate from rotating outwardly from the basket. Thus, the gate is always protected within the basket structure, whatever its position, reducing the risk of damage to the gate.

Each of the inward projections 42 comprises a continuation of the upper two horizontal supports 44,45 of the basket side walls, which are bent around into the front wall and over the sides of the opening. Preferably, the supports 44,45 are formed from one continuous wire which is bent to form a U-bend at its center, and two parallel portions which extend from the U-bend to the rear of the basket. The U-bend forms the inward projection 42 on each side of the opening. Preferably, the upper end of the gate is formed by the first cross wire or rod 38, and a second, reinforcing rod 48 extending across at least part of the upper end of the gate parallel to the first rod 38 and on the outside of the gate. This forms a strong structure which is resistant to warping or damage during use of the cart.

FIGS. 6 and 7 illustrate a method of using the cart to check out groceries or other items at a check out counter 50. The counter 50 is of a type having a cantilevered scanner portion 52 projecting forwardly from the remainder of the counter, at a height greater than that of the lower wall of the basket 16. The bar code scanner 54 is mounted on top of the scanner portion 52. The shopper will move their basket up to the end of the scanner portion 52, as indicated in FIG. 6, and the checker will lift items from the front portion of the basket and scan them across the scanner so that prices are entered in the register. As soon as the front portion of the basket has been cleared, the checker can lift and drop the front gate 26 into the basket. The opening will then provide clearance so that the basket can be pulled forward under the scanner portion 52, as indicated in FIG. 7. The checker can then reach items in the rear portion of the basket more readily, and these items are then lifted out of the basket and scanned.

This method will be much easier for the checker, avoiding the need to reach a long way back into the rear of the basket, as was typical in previous shopping carts with front gates which opened outwards onto the counter. Because the gate opens inwardly rather than outwardly, the cart does not have to be pushed backwards to provide clearance for opening the gate. Additionally, the gate is much less vulnerable to damage than a front opening gate.

Although an exemplary embodiment of the invention has been described above by way of example only, it will be understood by those skilled in the field that modifications may be made to the disclosed embodiment without departing from the scope of the invention, which is defined by the appended claims.

I claim:

1. A shopping cart, comprising:

a wheeled base;

a frame projecting upwardly from the base;

a basket having a rear end secured to the frame and projecting forwardly from the frame, the basket having a lower wall, a front end, and spaced side walls;

the front end of the basket having an opening; and a gate movably mounted in the opening in the front end of the basket for movement between a closed position closing the opening and an open position inside the basket lying on top of the lower wall.

2. The cart as claimed in claim 1, wherein the opening has a lower edge and spaced side edges, and the gate has a lower end hinged to the lower edge of the opening, the side edges having inward protrusions forming stops for preventing the gate from rotating outwardly from the basket, whereby the gate can only be rotated inwardly into the basket from the closed position.

3. The cart as claimed in claim 2, wherein the gate has opposite sides with hooks for releasably engagement over the inward protrusions in the side edges of the opening to releasably secure the gate in the closed position.

4. The cart as claimed in claim 1, wherein the front end of the cart comprises a front wall of wire grillwork construction having a lower edge, spaced sides, and an upper edge, the opening comprising an indented portion extending downwardly from the upper edge of the opening and having opposite sides spaced inwardly from the opposite sides of the front wall, and a lower end spaced upwardly from the lower edge of the front wall, the gate filling said opening in the closed position and having a lower end and spaced sides.

5. The cart as claimed in claim 4, wherein the opposite sides of said opening comprise a pair of vertical support rods, and the lower end of said opening comprises a horizontal support rod, the lower end of said gate having a pair of spaced eyelets hingably engaging over said horizontal support rod to permit said gate to pivot back and forth between said closed and open positions.

6. The cart as claimed in claim 5, including a protrusion projecting inwardly into the opening from each vertical support rod at the opposite sides of the opening, the opposite sides of said gate having hooks for releasable engagement over said protrusions.

7. The cart as claimed in claim 6, wherein said protrusions project in front of said gate and comprise stops for preventing said gate from pivoting outwardly from the cart.

* * * * *

UNITED STATES PATENT AND TRADEMARK OFFICE
CERTIFICATE OF CORRECTION

PATENT NO. : 6,193,246 B1
DATED : February 27, 2001
INVENTOR(S) : V. John Ondrasik It is certified that error appears in the above-identified patent and that said Letters Patent is hereby corrected as shown below:

Column 2,
Line 29, replace "and or" with -- and/or --

Signed and Sealed this

Eleventh Day of December, 2001

Attest:

NICHOLAS P. GODICI
*Attesting Officer*   *Acting Director of the United States Patent and Trademark Office*